No. 848,136. PATENTED MAR. 26, 1907.
W. E. SMITH.
EXERCISER FOR FELINES.
APPLICATION FILED MAR. 7, 1904.

Witnesses.
Warren D. Owen.
S. Wm. Lutton.

Inventor.
Walter E. Smith,
by Crosby Gregory,
Atty's.

UNITED STATES PATENT OFFICE.

WALTER E. SMITH, OF SALEM, MASSACHUSETTS.

EXERCISER FOR FELINES.

No. 848,136.

Specification of Letters Patent.

Patented March 26, 1907.

Application filed March 7, 1904. Serial No. 196,790.

*To all whom it may concern:*

Be it known that I, WALTER E. SMITH, a citizen of the United States, residing at Salem, in the county of Essex and State of Massachusetts, have invented an Improvement in Exercisers for Felines, of which the following description, in connection with the accompanying drawings, is a specification, like letters on the drawings representing like parts.

This invention relates to a device especially adapted for furnishing exercise and amusement to cats, and it comprises a chambered member filled with catnip or some other material which has a similar effect upon cats, said member being provided with apertures or perforations through which the odor of the catnip or other confined material may be obtained.

Figure 1:
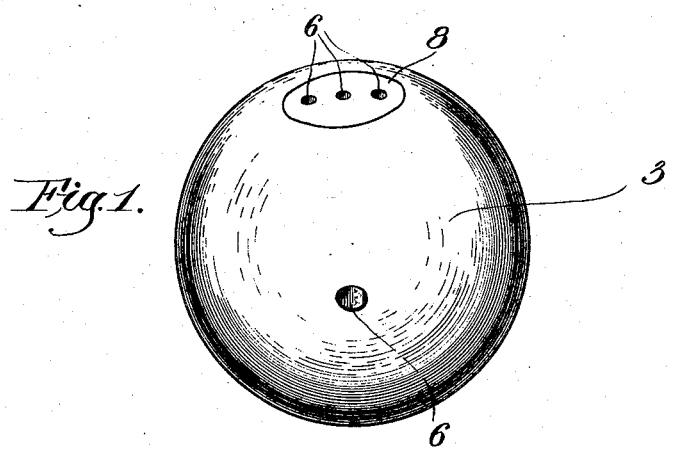
Figure 2:
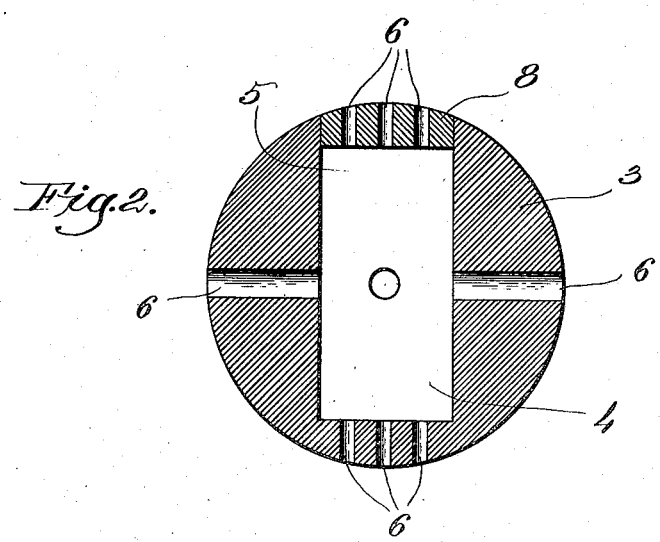

In the drawings, Figure 1 is a perspective view of one form of my invention, and Fig. 2 is a sectional view therethrough.

The body of the member is designated by 3 and is provided with a central chamber 4, in which is confined catnip 5 or some material which has an effect similar to catnip upon cats.

Leading into the central chamber 4 are a plurality of apertures 6, through which the cat gets the odor of catnip.

The device is used as a plaything for cats merely by giving it to the cat to play with. Upon getting the odor of the catnip through the apertures 6 the cat will work over and play with the device for long-continued intervals of time, thus getting in many cases much-needed exercise.

The device is especially useful in enticing well-fed, fat, and lazy cats to take the necessary exercise to keep them in good physical condition.

The device may be made in a great variety of ways and with a great variety of shapes. I prefer the spherical form shown, and when this form is used the chamber 4 may be made by making an axial bore partially through the sphere. When the chamber is filled with catnip and the end of the bore closed with a plug or cap 8, the device is ready for use. Any suitable number of apertures 6 may be employed, and they may be placed in any position. Preferably I will simply make apertures in the plug 8 and in the opposite end of the sphere.

The device may be cubical, pyramidal, or of any other shape without departing from the invention, provided it has the central chamber which is filled with catnip and a sufficient number of perforations leading to the chamber to admit of the felines getting a sufficient catnip odor so that they will play with it.

Having described my invention, what I claim as new, and desire to secure by Letters Patent, is—

1. As an article of manufacture, an exerciser for felines comprising a spherical body having a smooth exterior, provided with a central cavity or chamber extending axially thereinto and adapted to hold catnip, a removable plug closing one end of said chamber, and a series of apertures leading through the wall of said spherical body into said chamber through which apertures the feline gets the odor of the catnip.

2. As an article of manufacture, an exerciser for felines adapted to roll, and comprising a substantially spherical body having a cavity and an opening leading thereto to form an internal chamber adapted to contain catnip, and a plug to close said opening, said device also having a series of openings extending through the wall of the body and into said chamber, through which openings the feline gets the odor of the catnip.

In testimony whereof I have signed my name to this specification in the presence of two subscribing witnesses.

WALTER E. SMITH.

Witnesses:
LOUIS C. SMITH,
MARGARET A. DUNN.